United States Patent [19]

Hayosh et al.

[11] 4,009,369
[45] Feb. 22, 1977

[54] POLYPHASE SCANNER FOR BAR CODE SYMBOLS

[75] Inventors: Thomas D. Hayosh, Bloomfield Hills; John H. Carosella, Avon Township, both of Mich.

[73] Assignee: Schiller Industries, Inc., Troy, Mich.

[22] Filed: Apr. 16, 1975

[21] Appl. No.: 568,808

Related U.S. Application Data

[63] Continuation-in-part of Ser. No. 466,769, May 3, 1974, abandoned.

[52] U.S. Cl. .................. 235/61.11 E; 340/146.3 F; 350/6
[51] Int. Cl.² ................. G06K 7/14; G02B 27/17; G06K 9/10
[58] Field of Search .......... 250/216, 566, 567, 568, 250/569, 235; 340/146.3 Z, 146.3 AH, 146.3 F; 235/61.11 E, 61.7 R; 350/6

[56] References Cited

UNITED STATES PATENTS

| | | | |
|---|---|---|---|
| 3,417,231 | 12/1968 | Stites | 340/146.3 Z |
| 3,728,677 | 4/1973 | Munson | 340/146.3 F |
| 3,744,026 | 7/1973 | Wolff | 340/146.3 Z |
| 3,762,791 | 10/1973 | Fournier | 350/6 |
| 3,889,102 | 6/1975 | Dahlquist | 235/61.7 R |
| 3,916,158 | 10/1975 | Sansone | 235/61.11 E |
| 3,919,527 | 11/1975 | Bowen | 235/61.11 E |

*Primary Examiner*—Daryl W. Cook
*Assistant Examiner*—Robert M. Kilgore
*Attorney, Agent, or Firm*—Reising, Ethington, Barnard

[57] ABSTRACT

An optical scanner is disclosed for reading of bar code symbols on packages moving through a reading field. The scanner generates a polyphase scan pattern which is adapted for omnidirectional reading of a bar code symbol. The scanner, in one embodiment, comprises an oscillatory mirror driven by an electromechanical resonator for producing beam deflection along the amplitude axis and includes a rotary multifaceted mirror for producing beam deflection along the time axis. In another embodiment an optical galvanometer is used to produce beam deflection along the amplitude axis and in this embodiment a substantially straight line trace is produced in addition to the polyphase pattern.

34 Claims, 19 Drawing Figures

POLYPHASE SCANNER FOR BAR CODE SYMBOLS

This is a continuation-in-part of patent application Ser. No. 466,769 filed May 3, 1974 entitled "N-Phase Scan Pattern for Label Scanners", now abandoned. The entire disclosure of Ser. No. 466,769 is incorporated by reference in this patent application.

FIELD OF INVENTION

This invention relates to optical scanners and more particularly to method and apparatus for optically scanning encoded data symbols for the purpose of machine reading of the data contained therein.

BACKGROUND OF THE INVENTION

There are many known applications for optical scanners for reading encoded data. One exemplary field of commercial application is that of data processing in connection with supply, storage and sale of manufactured goods. Inventory control for goods in warehouses and retail outlets is an important application of optical scanners in automatic data processing. A specific application and the one for which the subject invention was developed is that of automated checkstands in retail stores, especially grocery stores. Other known applications of optical scanners for encoded data symbols include document control, mail sorting and rail car identification. This invention was developed initially for application to automated checkstands, i.e., the so-called "point of sale" data processing for retail stores and the description will be given with respect to embodiments adapted therefor; however, as the description proceeds it will be apparent that the invention is useful in a wide variety of optical scanning applications.

There have been several proposals for machine reading of encoded labels on individual articles of merchandise at the point of sale in retail stores. A system has been proposed which includes an optical scanner situated at a checkstand so that an encoded label on each article is scanned as the article is passed over the counter surface of the checkstand. Many difficulties have been encountered in the practical realization of such a system. These difficulties have centered around the need for a code symbol which can be mass-produced with a high degree of reliability at low cost and around the need for machine reading of the code symbol regardless of its orientation on the checkstand counter by apparatus which can be feasibly installed in the checkstand of a supermarket. These needs may be characterized as the "mass producible code symbol" and the "omnidirectional code reader."

The mass-producible code symbol and the omnidirectional code reader for point of sale installation pose requirements which tend to be conflicting, if not incompatible. The omnidirectional reading requirement, which arises from the allowance of random orientation of the code symbol, is susceptible to solution by use of a code symbol of circular format. However, the requirement for a mass-producible code symbol is best satisfied by conventional printing techniques and a code symbol of circular format does not lend itself to high speed, close tolerance printing. On the other hand, the well known bar code symbol which may take the form of multiple parallel lines of varying width, does lend itself to high speed, close tolerance printing because of its incremental character; however, the bar code format has posed great difficulty with respect to the requirement of omnidirectional reading.

In the background of this invention is the adoption by the Uniform Products Code Council of a machine readable code symbol for the Grocery Industry Universal Products Code (UPC). This UPC symbol has been presented as a standard for use in automated checkstands in grocery stores in the United States. This standard symbol is of bar code format, as will be described below, and hence is suitable to high volume, close tolerance printing. Its success in practical applications insofar as technology is concerned, will depend upon the availability of feasible omnidirectional code readers. This need has been the principal stimulus in the conception and development of this invention. This invention, which is fully described hereinbelow, provides an optical scanning method and apparatus which has omnidirectional reading capability especially well suited for a code symbol of bar code format.

THE PRIOR ART

In the prior art there have been several proposals for achieving omnidirectional reading capabilities by optical scanners for code symbols. As noted above, some of these proposals are based upon the use of a code symbol of circular format; some of the proposals have been presented for use with code symbols of bar code format. A brief discussion of this prior art follows. As to code symbols of circular format, the system set forth in the Sperry U.S. Pat. No. 3,414,731 is of background interest. The system of this patent is proposed for point of sale data processing and the patent discloses a code symbol of circumferential configuration with one or more annuli or bands composed of radially extending marks and spaces representing binary ones and zeros, respectively. An article with a code symbol thereon is moved over a scanning window in the check-stand counter. An optical scanner includes a means for acquisition and tracking of the code symbol; during tracking, the code symbol is scanned by an optical scanner which executes a circular scan pattern over the code elements of the symbol and a photodetector produces a signal which is processed to decode the encoded data. Another prior art optical code reader is disclosed in the Torrey U.S. Pat. No. 3,752,961; this patent discloses a code symbol of circular format and a circular scan pattern is employed. The prior art optical scanners of this type have omnidirectional reading capabilities with respect to circular code patterns but not with respect to code symbols of rectangular bar code format.

An omnidirectional optical code reader adapted for a code symbol of rectangular bar code format is set forth in the Myer U.S. Pat. No. 3,718,761. In the system of this patent an optical beam having an elongated transverse cross-section (i.e., producing a line of light on a target) is employed to scan the code symbol. The scanning pattern in the field where the code symbol is positioned is executed by moving the line of light across the field in multiple passes by means of a multifaceted rotating mirror, and then rotating the line of light about the scan axis by a small incremental angle, as by a Dove prism, and then repeating the multiple scans in the new direction. The scan pattern is completed by repetition of the linear and angular scan motion sequence until the rotative scan has made a full circle. Thus, at one angular position of the line, i.e., for one direction of linear scan, the line of light will be parallel to the elements of the code in the bar code symbol and the linear scan will traverse all elements so as to obtain a reading of the encoded data. A similar optical arrangement for scanning is disclosed in the Myer U.S. Pat. No. 3,758,753.

Another omnidirectional optical code reader adapted for rectangular bar code symbols is set forth in the Munson U.S. Pat. No. 3,728,677. In the system of this patent a laser beam is caused to execute a scan pattern in a fixed field through which the code symbol is moved. The scan pattern includes two straight line traces in the plane of the scanning field with the traces intersecting at right angles. The traces are directed at an angle of 45° relative to the direction of travel of the article bearing the code symbol through the field. This scan pattern is produced by a multifaceted rotating mirror which coacts with a pair of stationary reflectors which direct the beams from the laser onto the plane of the scanning field.

The McMurtry U.S. Pat. No. 3,770,942 also discloses an omnidirectional optical scanning device for rectangular bar code symbols. In this system, a stationary photosensitive device is of circular configuration with multiple sectors which are electrically separate. A rotating aperture plate is positioned over the photosensitive device and has an aperture with dimensions proportional to the dimensions of the elements of the bar code so that the elements of the bar code are viewed at all angles with a significant signal output when the aperture is aligned with the bar. This scanning system is adapted for handheld optical scanning devices wherein a scanner is manually positioned over the code symbol and advanced across the code elements.

The Connell U.S. Pat. No. 3,818,444 discloses an optical code reader for bar code symbols. In the system of this patent a laser beam is passed through a beam splitter and each of the resulting beams is caused to execute a straight line scan, the scan motions occurring alternately and producing an x-scan pattern. Each of the resulting beams impinges upon a separate multifaceted scanner, each scanner having alternate light and dark facets. The scanners are rotated synchronously and have the light and dark facets out of phase so that only one beam is reflected at a time to produce a trace in the scanning field.

A scanner which produces a scan pattern of closely spaced intersecting circular trace segments is disclosed in the Plockl U.S. Pat. No. 3,823,326. In the system of this patent a light beam is used to scan the reading plane with circular motion and after each circular sweep the beam is unidirectionally shifted to produce a pattern of intersecting circular arcs.

A particular disadvantage of the prior art methods and apparatus for omnidirectional reading of bar code symbols is the size and shape required for the reading field through which the bar code symbol must travel. Such apparatus, for example, requires a reading field depth, i.e., the dimension in the direction of code symbol travel, which is several times the height of the code symbol; as a practical matter the reading field must be 6 inches or more in depth. The operator is required to move a coded package the full depth of the reading field to insure that a valid reading of the code symbol will be obtained. Such a long reach is undesirable from the standpoint of operator fatigue and efficiency. The prior art apparatus is also disadvantageous in that it is complicated in design and, in some cases limited to undesirably low reading speeds.

BRIEF SUMMARY OF THE INVENTION

According to this invention, optical scanning method and apparatus are provided for omnidirectional reading of rectangular bar code symbols; the reading field may be small relative to that of the prior art scanning systems and the opportunity to read a code symbol in any orientation is greatly enhanced. In general, this is accomplished by providing a scan pattern in the form of a polyphase waveform. The scanning apparatus of this invention is relatively simple and compact and operates with a high degree of reliability.

Further, according to this invention, a scan pattern is produced which comprises a succession of phase displaced undulating traces; the wavelength, the amplitude and the phase displacement are correlated with the dimensions of the code field of the bar code symbol so that a reading may be obtained regardless of the orientation of the symbol. This is accomplished by repeatedly scanning the reading field from one side to the other with a light spot travelling in an undulating path, preferably sinusoidal, to produce a trace having a wavelength, amplitude and phase shift correlated with the dimensions of the code field.

In a first embodiment, the invention is adapted to read omnidirectionally an undersquare code field; it comprises method and apparatus for scanning an encoded data symbol with a succession of optical traces of which two or more are of undulating waveform and one of which is of undulating waveform with a relatively small slope angle and may be a straight line. The symbol is moved in a given direction through the scanning field which may have any desired width. More particularly, the invention comprises apparatus for and method steps of moving a beam of radiant energy in a repetitive pattern of sequential excursions along the scan or time axis which extends transversely of the direction of movement of the code symbol through the scanning field, two or more of the excursions producing traces of undulating waveform in polyphase relation and with a peak-to-peak amplitude greater than the width of the code field and having more than one cycle extending over the width of the scanning field. The random orientation of a rectangular bar code symbol is accommodated within the scanning field by a pattern in which successive traces have a waveform inclined with respect to the time-axis at an angle approximately equal to the acute angle of intersection of a line normal to the code elements or bars and the diagonal line across the rectangular code field. Omnidirectional capability for undersquare code field is provided by an additional fields producing a trace having a relatively small slope angle. The scan pattern, is preferably formed of successive traces, two or more traces being approximately sinusoidal in wave shape, the traces being phase displaced along the time-axis and having more than one cycle per phase and an additional trace which is approximately a straight line along the time axis.

In a second embodiment, the invention is adapted to read an oversquare code field; it comprises method and apparatus for scanning an encoded data symbol with a polyphase wave pattern in which all phase wave-traces have the same wavelength, amplitude and uniform phase displacement which are correlated with the dimensions of the code field. The reading field is repeatedly scanned from one side to the other with a light spot travelling in a sinusoidal path to produce a trace waveform and shifting each successive trace waveform relative to said reading field, the amount of said shifting being a fraction of a wavelength whereby the trace of the light spot will intercept all code elements of the code field in succession regardless of the orientation of the code symbol relative to the reading field. The scanner comprises a light beam deflection means for cyclically deflecting the beam across the reading field and for simultaneously cyclically deflecting the beam along the depth of the reading field and preferably produces a trace segment with a sinusoidal waveform for each deflection across the reading field. The waveform of each trace has a maximum slope angle greater than 45° and a peak-to-peak amplitude greater than the width of the code field. Preferably, the displacement between phase traces is less than the height of the code field. The deflection means suitably comprises first and second mirror means in the path of the light beam and having respective drive means for producing deflection of the beam in the direction of the width or transverse axis and in the direction of the depth or longitudinal axis of the reading field, respectively. In particular, at least one of the mirror means is driven by an oscillatory motor. It is preferred, however, to utilize an oscillatory motor for driving the mirror which displaces the beam in the direction of the depth axis and to use a rotary motor for driving the mirror means for producing the deflection in the direction of the width axis, such mirror means taking the form of a multifaceted rotatable mirror.

DETAILED DESCRIPTION

A more complete understanding of this invention may be obtained from the detailed description that follows, taken with the accompanying drawings in which.

Figure 1:
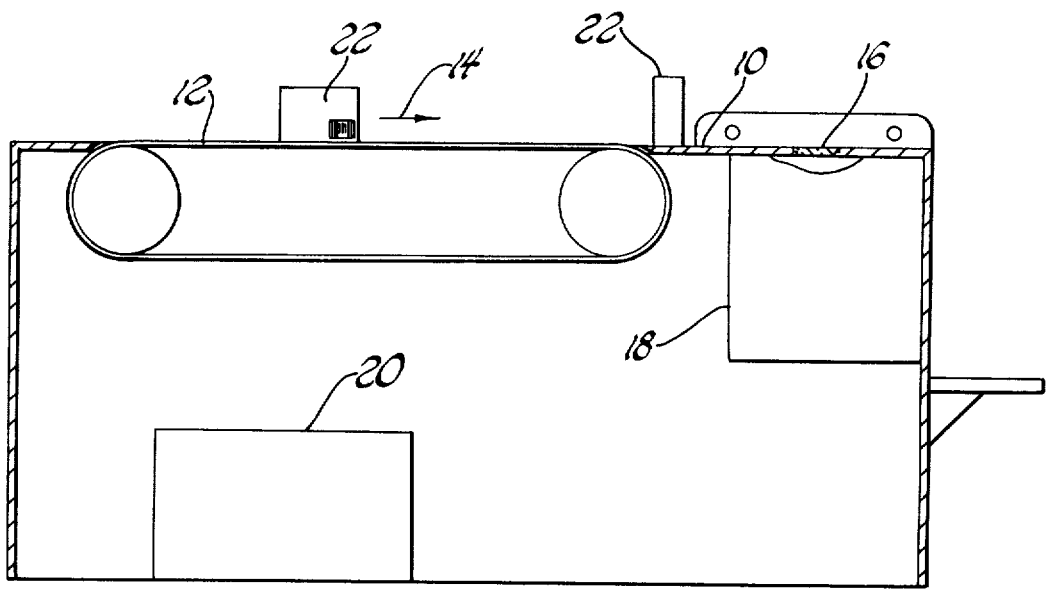
FIG. 1 is an elevation view of a service counter forming a part of a checkstand.

Referring now to the drawings, there is shown an illustrative embodiment of the invention in method and apparatus especially adapted for optically scanning a bar code symbol disposed at random orientation within a scanning field; the bar code symbol is applied to an article of goods which is moved into or through the scanning field in a counter top at a checkstand of a retail store. The illustrative embodiment may be characterized as an optical scanner for point of sale (POS) data processing using a rectangular bar code format such as the Universal Product Code (UPC) symbol. It will be appreciated, however, that the invention is useful in a variety of applications of optical scanning, especially for code reading.

FIG. 1 shows a checkstand counter, such as may be used at a supermarket which is typical of the installation site of the apparatus of this invention. The counter includes a counter top 10 which the checkout cashier uses as a work surface for processing the articles of merchandise or products being sold. A conveyor 12 may be provided in the counter top to advance the products in the direction of the arrow 14. The counter top 10 is provided with a transparent window 16 which in the illustrative embodiment is about 3 inches in depth (direction of product flow) and about 6 inches wide. A scanner head 18 which incorporates features of this invention is mounted under the counter top 10 and has a scanning field of view extending through the window 16. A controller 20 for the scanning head is also suitably disposed beneath the counter top. In processing the products, such as packages 22, they are moved one-by-one by a human operator across the window 16 with the coded label thereon in the field of view of the scanner head.

In the illustrative embodiment being described, the purpose of the optical scanning of this invention is to read encoded data which has been printed on or applied individually to the articles or packages being processed at the checkstand. The particular data applied to the products by a code symbol may represent information serving various purposes in connection with the business involved. For example, the encoded data may include the identification number of the manufacturer and the product identification number. As a further example, in the case of meat and produce, the data encoded may contain price and weight information.

Figure 2:
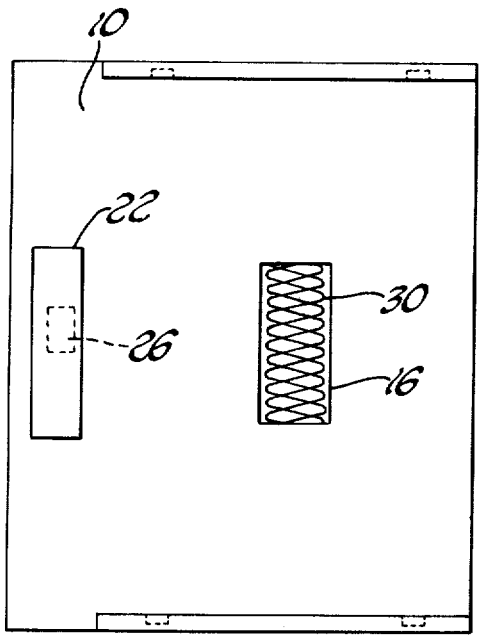
FIG. 2 is a plan view of part of the counter of FIG. 1.

In FIG. 2, which is a plan view of the counter top 10, the package 22 is shown with a label 26 on the bottom surface of the package. The label, as will be discussed in detail later, bears encoded data in a code field of predetermined format. The label 26 and hence the code field may be passed over the window 16 in any angular orientation so long as the scanning beam can impinge upon the code field. The label may be flat against the window or it may be tilted out of the plane of the window, even at angles up to ninety degrees, provided that the scanner head projects a scanning beam which is inclined relative to the window. A scan pattern 30 is produced according to this invention so that the encoded data of a code symbol will be read regardless of its orientation within the reading field.

Figure 3:
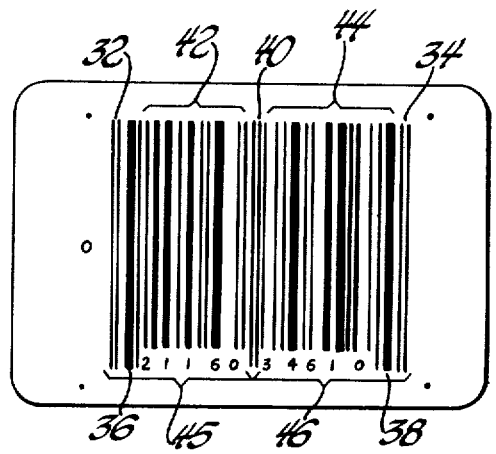
FIG. 3 shows the format of a rectangular bar code symbol.

Before proceeding with the description of the method and apparatus for producing the scan pattern, the code symbol which is used in the illustrative embodiment will be described. The code symbol, shown in FIG. 3, is typical of code symbols which this invention is especially adapted to read omnidirectionally and is of a rectangular bar code format. This code symbol is representative of the UPC standard symbol adopted by the Uniform Product Code Council. The bar code symbol is in the form of a series of parallel light and dark bars of different widths for machine reading of the encoded data, together with the equivalent numeric characters in human readable form at the bottom of the code bars. The overall shape of the code field of the symbol is rectangular and comprises a series of light and dark parallel code bars in closely spaced arrangement. The left margin contains an alphanumeric character which signifies the number system of the particular code. Each character or digit of the code is made up of seven data elements or modules which might be dark or light and the left-hand and right-hand margins are both light and at least seven modules wide. Each module represents a binary digit, with the dark bar being a binary 1 and the light bar being a binary 0. A left-hand guard bar pattern 32 and a right-hand guard bar pattern 34 provide side boundaries for the other code bars. Each guard bar pattern is in the form of a dark module, a light module and a dark module which is the encoding of 101. Each character of code is made up of seven modules and is represented by two dark bars and two light spaces with each dark bar being made of one, two, three or four dark modules. The tall bars 36 represent the number system character and the tall bars 38 represent a module check character. The central tall bars 40 separate five characters of code 42 on the left-hand side from five characters of code 44 on the right-hand side. The symbol shown in FIG. 3 is one version of the UPC standard symbol which contains two information code fields. A left-hand information code field 45 comprises guard bars 32, number system bars 36, code bars 42 and central bars 40; a right-hand information code field 46 comprises central bars 40, code bars 44, modulo check bars 38 and guard bars 34. Other versions of the UPC standard symbol, not shown, contain either single or double code fields. It will be understood that, insofar as optical scanning is concerned, the same principles apply to all versions. In the version of the symbol to be described below, the two information code fields are juxtaposed. Taken together, the two code fields comprise all the information encoded by the symbol.

A readout of the information represented by the code symbol can be obtained by a single-sweep interception or by a double-sweep interception, depending upon the capability of the data processing equipment which accepts the output of the optical scanner. In the single-sweep interception all of the code bars of both information code fields are intercepted successively by the scanning trace, i.e., in a single excursion of sweep across the code symbol. In other words, the scanning trace must start with the guard bars on either the left-hand or right-hand side of one code field and end with the guard bars on the other side of the other code field, having intercepted all of the bars in between. The direction of the trace in making such interceptions may be rectilinear or curvilinear and a valid readout will be obtained so long as all of the code bars are intercepted in the one continuous sweep or trace.

In the double-sweep interception, the two information code fields may be read separately, i.e., by different excursions or sweeps of the scanning trace during a single traverse of the symbol through the reading field. If the two information code fields are read by different sweeps, or if they are read together by the same sweep, the information represented by one field is combined with that of the other by the data processing equipment which accepts the output of the optical scanner. Further, in the double-sweep interception the scan of a code field may be in either direction across the code bars. The left-hand and right-hand code fields are distinguishable in data processing by virtue of odd parity for one and even parity for the other in the code. One direction of scan is distinguishable from the other by reason of the sequence of data which is recognized by the decoding algorithm of the data processor.

In the matter of omnidirectional reading of bar code symbols, one of the most significant properties of the symbol is the relationship between the height and width of the information code field. For purposes of discussion the ratio of the height to the width is referred to as the "aspect ratio". This property of the code field, i.e. the ratio of height to width, is also expressed in terms of "squareness". In this terminology, a code field with an aspect ratio greater than unity is said to be "over-square" and one with an aspect ratio less than unity is "undersquare". In general, omnidirectional reading is facilitated by a higher aspect ratio. In other words, there is greater opportunity for the scanner to read an over-square code field than with a square or under-square code field.

Figure 4:
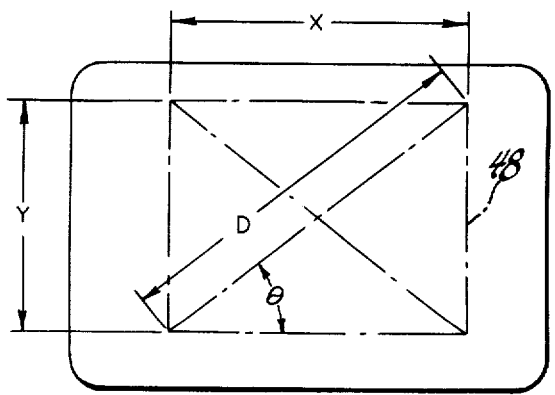
FIG. 4 shows the code field of the code symbol.

The code symbol shown in FIG. 4 has the overall proportions of the regular UPC symbol (Version A). With data processing equipment which is capable of reading only by single-sweep interception, this code symbol is regarded as a single code field which is under-square.

The code field extends laterally between the outermost limits of the guard bars and has a dimension of X. The code field extends from top to bottom between the upper and lower ends of the code bars and has a dimension Y. The code field 48, is, of course, rectangular and has a lateral or x-axis dimension X which is greater than the up and down or y-axis dimension Y. It is noted that the aspect ratio of the symbol is expressed as X:Y; in the nominal size of the UPC symbol, $X = 1.3$ inches and $Y = 0.9$ inches which yields an aspect ratio of 0.73. It is significant, however, that the symbol size is variable within a magnification range from 0.8 to 2.0. Referring further to FIG. 4, it is noted that the diagonal lines, $d1$ and $d2$, of the code field 48 have a dimension D and the angle of intersection, $\theta$, with the x-axis is approximately 36°. As will become apparent hereinafter, this angle of the diagonal of the code field is of significance in relation to the configuration of the scan pattern.

Figure 13:
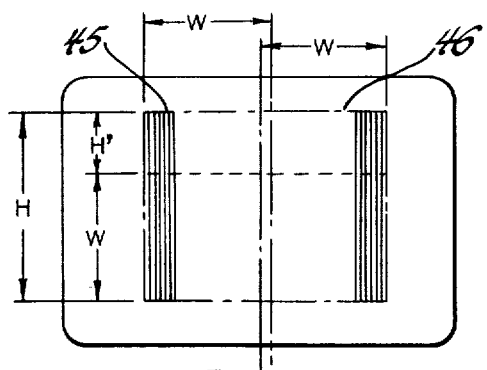
FIG. 13 shows the information code fields of a bar code symbol.

The code symbol of FIG. 13 is also a regular UPC symbol (Version A) and the code fields 45 and 46 are shown in outline form. With data processing equipment which is capable of reading by double-sweep interception, this code symbol is regarded as a double code field with each code field being oversquare. As discussed with reference to FIG. 13, the code fields 45 and 46 are slightly overlapping due to the fact that both fields include the center bars. Each code field 45 and 46 has a height H and a width W. A "square" code field would have a height equal to the width W as indicated by the broken line and the dimensions shown in FIG. 13. The amount of oversquareness is indicated by the dimension H' and it may be expressed as a percentage of the width. The significance of oversquareness is, of course, that it increases the opportunity to read the code for a given product flow rate and spot speed of the scanner.

The standard UPC code symbol of the type illustrated (Version A) has a nominal size wherein the width is 0.65 inches and the height is 0.90 inches. This corresponds to an aspect ratio of 1.4.

FIRST EMBODIMENT OF THE INVENTION

Figure 5:
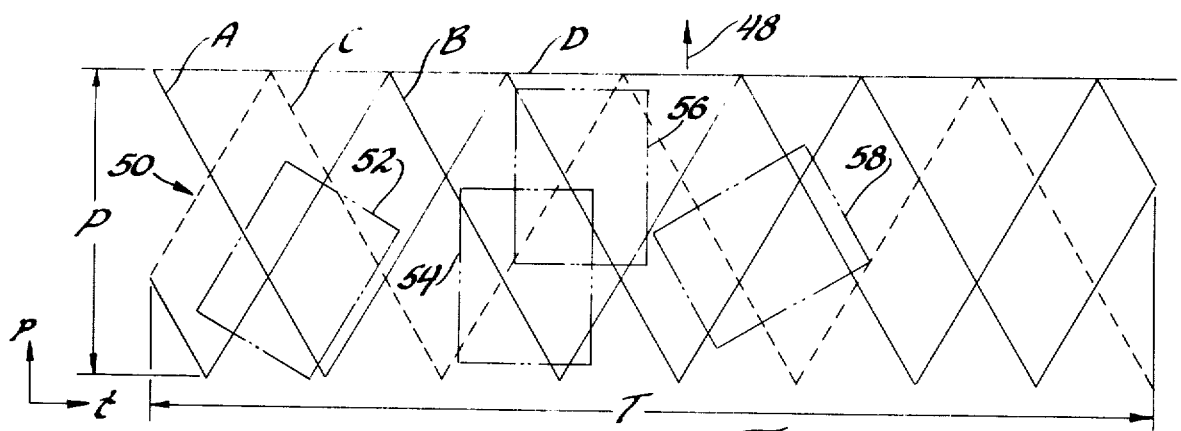
FIG. 5 shows a scan pattern in accordance with this invention.

FIG. 5 shows an exemplary form of scan pattern for use with a rectangular bar code symbol having a code field which is undersquare, such as that as described with reference to FIGS. 3 and 4. In FIG. 5 the reading field is laced with a scan pattern 50 which will be designated, for reasons which will become apparent, as a "three-phase and straight line" pattern. This scan pattern is bounded by the scanning field which is rectangular with a time-axis $t$ and a dimension T and which has an amplitude axis $p$ and a dimension P. Within this scanning field plural scanning traces are produced by scanning means which will be described hereinbelow. The arrow 49 shows the direction of travel of a code symbol through the reading field.

The scanning traces are the lines of intersection between an optical beam and a plane or target surface and having a width depending upon the cross-section of the beam, the beam being directed in a generally normal direction relative to the plane. The plane of the scanning field may be taken as the upper surface of the window 16 or the surface of the code symbol itself. As shown in FIG. 5, the scan pattern is comprised of a first trace A which is of undulating waveform, specifically a triangular waveform, which has its starting point at the upper left-hand corner of the scanning field. The trace A has a peak-to-peak amplitude equal to the dimension P of the scanning field and describes two complete cycles and a fraction of a cycle before reaching the right-hand edge of the scanning field. The trace B is of the same waveform and amplitude as the trace A and lags, in time, behind the trace A by a phase angle of 120°. Similarly, the trace C is of the same waveform and amplitude as the trace A and lags, in time, behind the trace B by a phase angle of 120°. The traces A, B and C are not, in fact existent simultaneously; instead, they are produced sequentially or successively with the full extent of trace A being completed through the scanning field before the trace B starts through the scanning field and trace B is completed before the trace C starts through the scanning field. Upon completion of trace C a fourth trace D in the form of a straight line, is produced across the peaks of the waveforms A, B and C. The trace D may occupy any position in the scanning field and need not be at the upper limit thereof as shown; additionally, it will appear from the description below that the traces need not be produced in the sequence A, B and C, as described, but may be produced in any desired sequence.

In the exemplary scan pattern of FIG. 5, the angle of the waveforms relative to the time axis t is chosen to be approximately equal to $(90°-\theta)$ where $\theta$ is the angle of intersection between the diagonal line and the x-axis of the code field 48 of the code symbol. This is a first condition for the relationship between the code field and the scan pattern to ensure omnidirectional reading of the code symbol. For purposes of explanation, attention is called to the illustration in FIG. 5 of the code fields 52, 54, 56 and 58 shown in various orientations and superimposed on the scan pattern. The code field 52 is oriented so that the x-axis is parallel to the ascending portions of traces A, B and C. In this orientation the ascending portions of the trace B intercept all of the code bars successively at right angles. The code field 54 is oriented with its x-axis perpendicular to the time-axis t and accordingly the ascending portion of trace C intercepts the bar elements parallel to the diagonal $d1$ of the code field. In the position shown, not all of the bar elements are intercepted successively but with slight additional movement of the code field through the scanning field in the direction of the arrow 49 the trace C will intercept all bar elements successively. Code field 56 which has progressed further through the scanning field is oriented the same as the code field 54 and previously passed through a position in which the trace A, in its descending portion, intercepted all of the code elements, successively. The code field 58 is oriented with its x-axis at an angle of $2\theta$ relative to the amplitude axis of the scanning field. In this orientation the ascending portion of the trace A is parallel to the diagonal $d2$ of the code field and hence intercepts all of the code elements successively.

Figure 6:
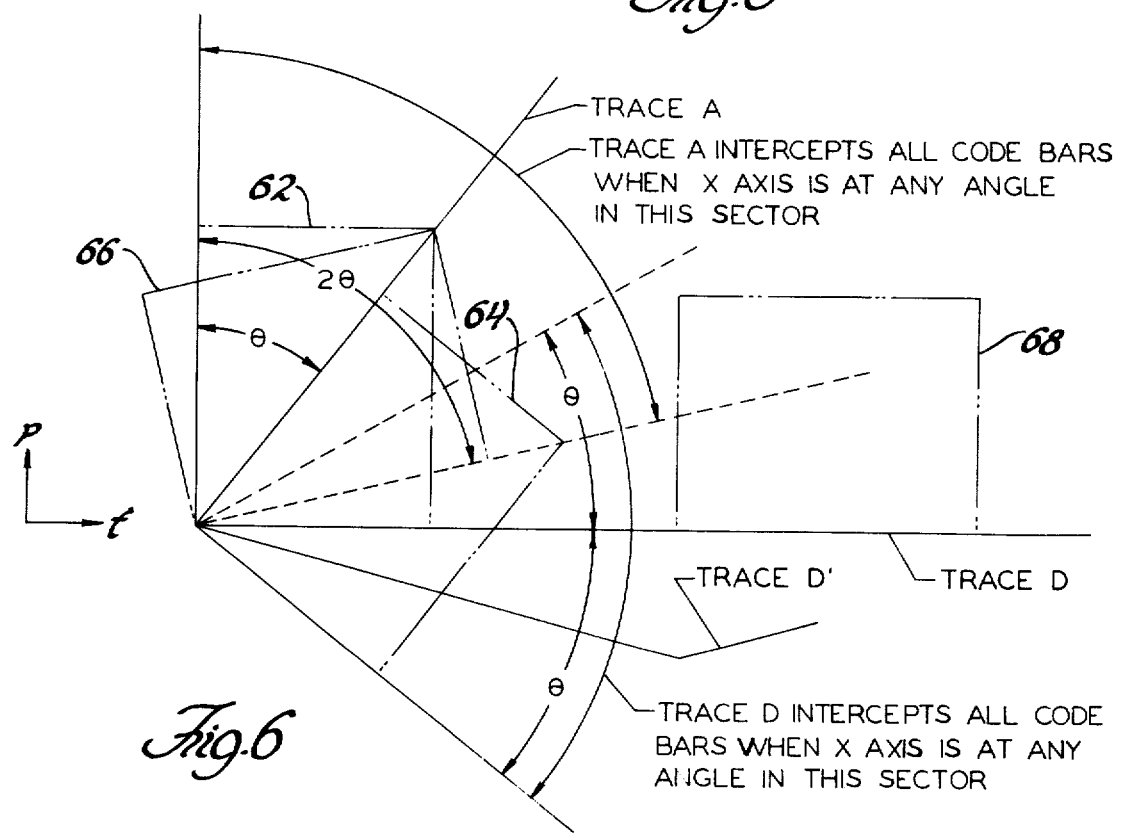
FIG. 6 is a diagram to aid explanation of the omnidirectional character of the scan pattern.

A somewhat more rigorous showing of the omnidirectional character of the scan pattern will be given with reference to FIG. 6. FIG. 6 shows, on an enlarged scale, a portion of the ascending waveform of trace A and a portion of the straight line trace D extending along the time-axis $t$. As in the case of FIG. 5, trace A intersects the time-axis $t$ at an angle of $(90°-\theta)$ where $\theta$ is equal to the acute angle between the x-axis and the diagonals of the code field 48. When the code field 62 is oriented with the x-axis perpendicular to the time-axis $t$ the trace A will intercept all of the code elements along the diagonal line $d1$; when it is rotated to the orientation of code field 64 the trace A will intercept all of the code elements perpendicular thereto. If the code field is rotated further to the orientation of code field 66 (shown shifted to the left), trace A will intercept all of the code elements successively along the diagonal $d2$. In summary, trace A intercepts all of the code bars when the x-axis of the code field is at any angle, relative to the time-axis $t$, between 90° and the angle of $(90°-2\theta)$. When the orientation of the code field is rotated further in the clockwise direction beyond this angle, trace A is ineffective to intercept all of the code bars. However, the trace D is effective in this range of orientation angles, with limits as indicated in FIG. 6. With a code element 68 oriented with its x-axis parallel to the time-axis $t$, the trace D intercepts all of the code elements at right angles thereto. It can be seen that for any orientation between that of code field 68 and an orientation with the x-axis thereof at a clockwise angle $\theta$, the trace D will intercept all of the code bars of the code field. Similarly, at any orientation between that of code field 68 and a counterclockwise rotation of the code field through an angle $\theta$, the trace D will intercept all of the code elements.

Thus, it can be seen from FIG. 6 that with the ascending portion of trace A at the angle $\theta$ from the amplitude axis, the code field will be completely scanned by the trace A for all orientations of the x-axis of the code field ranging from the amplitude axis P through a clockwise angle of $2\theta$. Further, it is seen that the trace D, in the form of a straight line along the time-axis $t$, is effective to intercept all code elements of the code field in an orientation ranging from a counterclockwise angle $\theta$ from the time axis $t$ to a clockwise angle $\theta$ from the time axis. It is further noted, with reference to FIG. 6, that the trace D need not be a straight line in order to effect a continuous successive scan of all of the code elements; instead, it may be of undulating waveform, such as a triangular waveform D', provided that the waveform has a relatively small slope angle equal to or less than the angle $\theta$. If trace D is of undulating waveform, it need not have the same frequency as trace A. The relation described above for the code field and the ascending portion of trace A when the code field is rotated clockwise from the amplitude axis also holds for the descending portion of trace A when the code field is rotated counterclockwise from the amplitude axis. Further, it is obvious that the code field, for any orientation may be rotated 180°, i.e. reversed, and present the same degree of readability as before reversal. Accordingly, the aforementioned first condition for omnidirectional capability requires a predetermined angularity of the traces A and D or D', as discussed above.

Omnidirectional capability of the scan pattern also depends upon a second condition which requires a predetermined minimum peak-to-peak amplitude of the waveforms of traces A, B and C. By inspection of FIG. 6 with reference to trace A and code field 62, it is apparent that the peak-to-peak amplitude of the waveform of trace A must be at least as great as the x-axis dimension X of the code field. If the amplitude were of lesser value, less than all of the elements would be intercepted by the trace A with the code field in the orientation of code field 62. It may be greater than the x-axis dimension of the code field, subject however, to a third condition having to do with the time-axis spacing, i.e. the phase angle, of the successive traces.

The omnidirectional capability of the scan pattern is further dependent upon a third condition which requires a predetermined relationship between the time-axis spacing of the successive traces and the y-axis dimension of the code field. By inspection of FIG. 5 with reference to the code field 52, it is noted that the ascending portion of trace A intercepts some but not all of the code elements in the motion of the code field 52 preceding its illustrated position in the scanning field. Since the trace A was ineffective to obtain an interception of all of the code elements, the code field 52 would fail to be read in the orientation shown, except for the fact that the ascending portion of trace B intercepts all of the code elements of the code field. This occurs because the y-axis dimension Y of the code field is greater than the spacing of the traces A and B along the time-axis $t$. Thus the maximum spacing of the successive traces along the time-axis, i.e. the phase displacement between them, must not exceed the y-axis dimension Y of the code field. The phase displacement of the successive traces may be less than the dimension Y, but of course sufficient phases must be provided in the scan pattern to satisfy the stated requirement.

In practice of the invention, trace waveforms of triangular shape, as shown in FIG. 5, are not practical at high scanning rates. Instead, sinusoidal or approximately sinusoidal waveforms are preferred in the scan pattern. It will be appreciated that the angularity of the sinusoidal waveform trace relative to the time-axis will vary throughout the cycle of the waveform. However, such variation can be tolerated and the omnidirectional capability of the scanning pattern achieved by making suitable adjustments in meeting the above discussed conditions. Several examples of scan patterns formed of traces having sinusoidal waveforms and a straight line will be described below.

Figure 7:
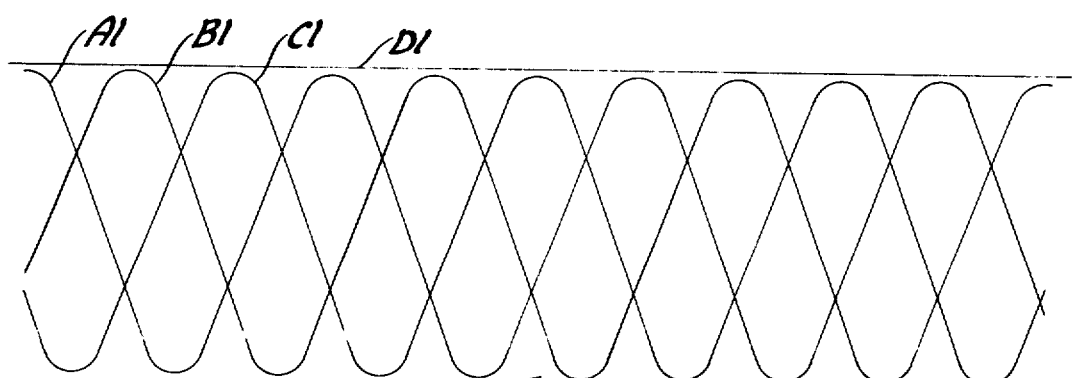
FIG. 7 shows a 3-phase scan pattern with a straight line.

FIG. 7 shows a scan pattern with traces A1, B1 and C1 which are of sinusoidal wave shape in a 3-phase relationship. This scan pattern also includes a trace D1 in the form of a straight line. It is noted that the trace A1 starts at the left side of the scanning field at the maximum amplitude point and describes three and one-third cycles in reaching the right-hand side of the scanning field. Trace B1 starts at the left-hand side of the scanning field at the same amplitude as the end point of trace A1 and described three and one-third cycles before reaching the end point at the right-hand side of the scanning field. Trace C1 starts at the left-hand side of the scanning field at the same amplitude as the end point of trace B1 at the right-hand side of the scanning field and describes three and one-third cycles before reaching the end point at the right-hand side of the scanning field. Since each of these traces A1, B1 and C1 describes three and one-third cycles, with each successive trace starting with an amplitude the same as that of the end point of the preceding trace, the three traces in succession describe a total of ten cycles. Consequently, the end point of the trace C1 is at the same amplitude as the starting point of trace A1. Trace D1 is the straight line starting at the left-hand side of the scanning field at the maximum amplitude point and extending to an end point at the right-hand side of the scanning field at the maximum amplitude. The entire scan pattern is repeatedly traced in the manner just described. Thus the scan pattern is produced by four distinct time sequential traces which are superimposed in space on the scanning field. Each of the four traces A1, B1, C1 and D1 are produced in four equal time-sequential time frames with the trace of each time frame occupying the same region, i.e., the scanning field. At the high scanning rates of the optical system to be described for producing the scanning pattern, all four traces on a target surface would appear to the human eye to exist simultaneously because of the persistence of vision of the eye. However, the four traces do not in fact exist simultaneously and, in fact, no two parts of the same trace exists simultaneously since the trace is merely the path or pattern of a high velocity spot of light impinging upon the target.

In order to obtain the relationship among the successive traces whereby one trace begins at the amplitude where the preceding one ends, the fractional part of the number of cycles per time or scanning frame is determined in accordance with the number of phases of the sinusoidal waveform. In general for a polyphase scan having $\phi$ phases, the number of deflection cycles along the amplitude axis for each deflection along the time axis is given by the expression: $K \pm n/\phi$, where $n$ is any integer less than $\phi$ except those which can be divided evenly into $\phi$ and where K is any integer.

Figure 8:
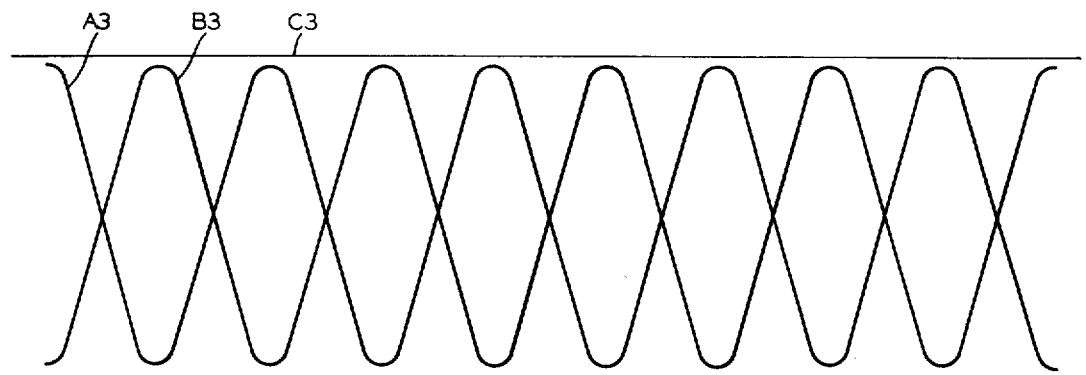
FIG. 8 shows a 2-phase scan pattern with a straight line.

Another example of a polyphase scan pattern using successive traces of sinusoidal waveform is shown in FIG. 8. This scan pattern comprises two traces A3 and B3 of sinusoidal waveform in a 2-phase relation and a trace C3 which is a straight line. This pattern is defined by setting the integer K equal to four and the integer $n$ equal to one which, in the expression $K+n/\phi$, yields 4½ as the number of amplitude axis deflection cycles per time axis cycle. This is referred to as a 9/2 pattern since this is the fractional expression of the deflection frequency ratio. It is noted that trace A3 has a starting point at one peak amplitude point and an end point at the opposite peak amplitude point. Trace B3 has a starting point amplitude at the end point amplitude of trace A3 and an end point amplitude at the starting point amplitude of traces A3 and C3. Trace C3, being a straight line, has an end point amplitude equal to the starting point amplitude for trace A3 so that the scan pattern ends in readiness for a repetition of the same pattern.

Figure 9:
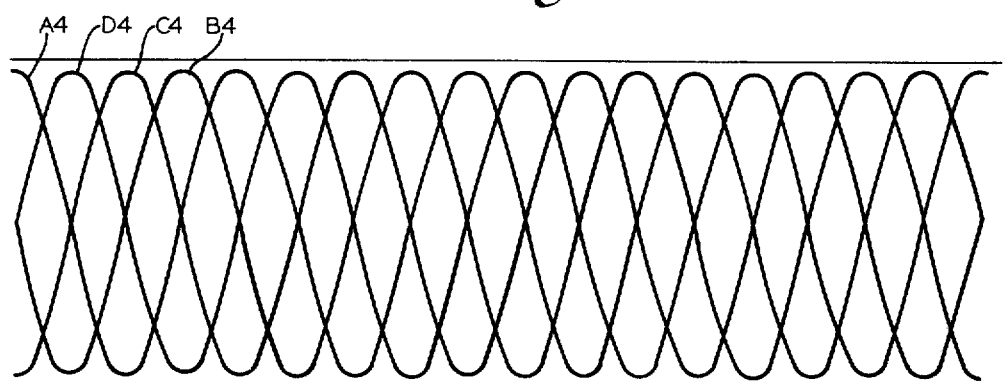
FIG. 9 shows a 4-scan pattern with a straight line.

FIG. 9 shows a further example of a polyphase scan pattern. This scan pattern is a 4-phase and straight line pattern, i.e. it comprises four traces A4, B4, C4, D4, of sinusoidal waveform and a straight line trace E4. This pattern has a deflection frequency ratio of 17/4. The starting points and end points of the traces of this scan pattern have the same relationship as described with the scan pattern of FIGS. 7 and 8.

Figure 10:
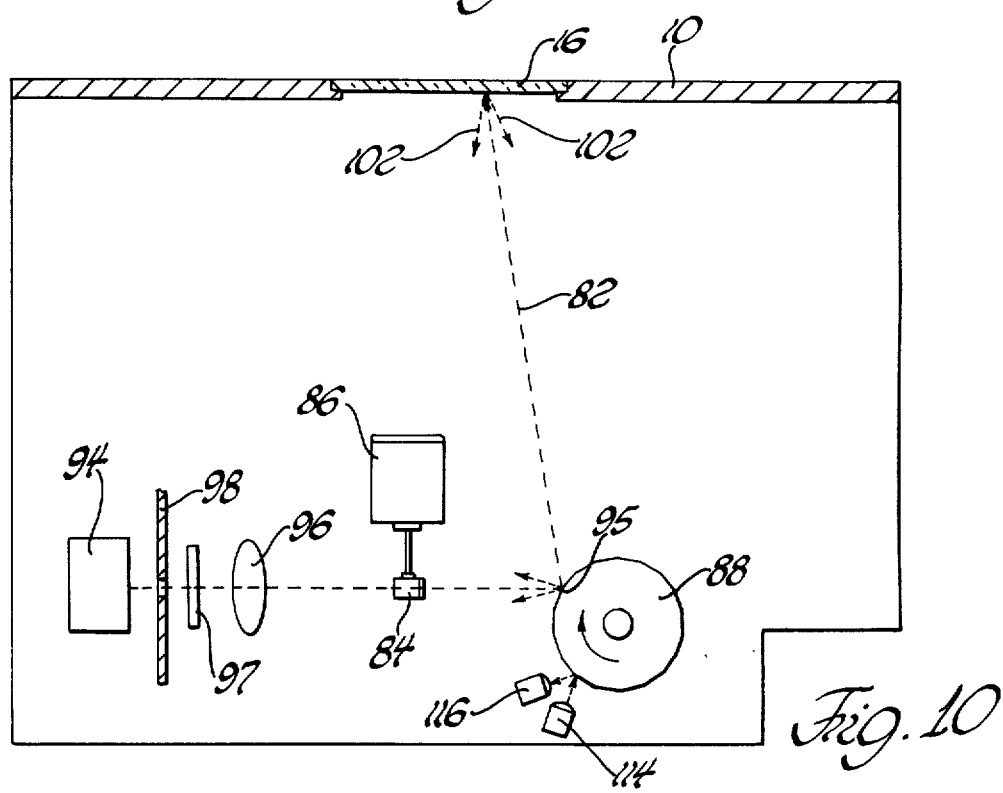
FIG. 10 is a diagram of one form of scanning apparatus according to the invention.
Figure 11:
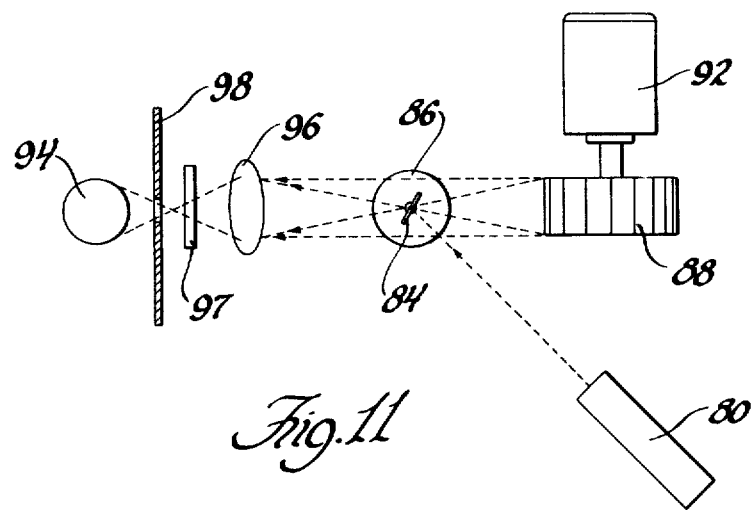
FIG. 11 shows another view of the apparatus in FIG. 10.

Referring now to FIGS. 10 and 11, one form of apparatus for generating the scan patterns of this invention is illustrated. The apparatus is illustrated in an elevation view in FIG. 10 and in a plan view in FIG. 11.

The scanning apparatus, as shown in FIG. 10, is suitably disposed beneath the counter top 10 of the checkstand which was described with reference to FIG. 1. The scanning apparatus comprises two distinct but coacting scan motion producing components, namely, a rotatable multifaceted mirror 88 and an optical galvanometer 86. The multifaceted mirror 88 is rotated at constant speed and is operative to cause the beam to sweep across the scanning field in a direction parallel to the time axis. The optical galvanometer 86 is suitably of conventional construction and produces an oscillatory scan motion of the beam in a direction transversely of the time axis. The optical galvanometer 86 is suitably constructed in accordance with the disclosure of the Montagu U.S. Pat. No. 3,624,574. The galvanometer may be provided with a signal conditioning circuit such as that described in Electro-optical Systems Design, April, 1971, Milton S. Kiver Publications, Inc. at pages 21 through 24.

Referring now to FIGS. 10 and 11 together, the scanning apparatus further comprises a source of radiant energy in the form of a laser 80, such as a helium-neon laser which emits a beam 82 of coherent radiation in the visible portion of the spectrum. The laser beam is focused by a lens system in the laser so that the beam is in focus relative to the window surface. The optical beam 82 impinges upon mirror 84 of the galvanometer 86 which is energized to produce oscillatory angular displacement of the mirror 84 in accordance with the desired waveform for the traces of the scanning pattern. The optical beam is reflected from the galvanometer mirror 84 onto the rotating multifaceted mirror 88 which is driven at a predetermined rotative speed by a motor 92. It is noted that the oscillatory angular displacement of the mirror 84 causes the optical beam 82 to sweep across the particular facet 95 of the mirror 88 on which it is impinging. Of course the mirror 88 has an axial dimension sufficient to accommodate the full extent of the angular sweep of the optical beam. As shown in FIG. 10, the beam 82 is reflected by the intercepted facet of the rotating mirror 88 onto the window 12 in the counter top 10. The facets 95 of the rotating mirror 88 intercept the beam 82 successively as the mirror rotates and each facet causes the beam to sweep across the scanning field on the window 12. Of course, the beam scan motion is initiated upon the initial interception by a given facet and the sweep ends when the given facet no longer intercepts the beam; however, the facets are contiguous and the beam sweep is repeated by the succeeding facet. Hence the scanning motion of the beam as produced by the rotating mirror 88 is unidirectional; it has very fast reset without a visible retrace, and establishes the time-axis of the scan pattern.

In order to detect the interception of the scanning beam with the code elements of the encoded label being scanned, an optical system and photodetecting means are provided as shown in FIGS. 10 and 11. The optical system for detection of the return light resulting from the coaction of the scanning beam and the encoded label is especially adapted to maximize the signal collection and to reject ambient light. The optical system including the photodetector provides for "derotation" of the return light, i.e., the return light which results from the beam coacting with the encoded label and moving at high speed over the scanning field is caused to be stationary in its impingement upon the photodetector. For this purpose, a portion of the return light which is scattered from the code field is also reflected from a facet of the rotating multifaceted mirror before it is allowed to impinge upon the photodetector. This arrangement is described more fully below.

The photodetector 94, suitably a photomultiplier tube, is positioned in operative relation to the reflection of the beam 82 from the scanning field. The photodetector 94 is postioned behind a collecting lens 96, a spectral filter 97, and an aperture plate or field stop 98 which are in alignment with the path of the optical beam 82 as it is reflected from the galvanometer mirror 84. The field stop 98 has a slit 99 extending parallel to the rotation axis of the mirror 88. Thus the portion of the beam reflected from the code field of the label 24 during the beam scan thereacross is reflected back onto the facet 94 of the rotating mirror 88 in a divergent or diffuse manner, as indicated by the arrows 102 and 104. From the facet 94 the reflected radiant energy is collected by the lens 96 and focused through the field stop 98 onto the photodetector 94.

The fieldstop 98 is effective to confine the light signal collection to the small area of the laser beam spot and thus minimize the ambient light impinging upon the photodetector. The collecting lens 96 is effective to focus the image of the laser beam spot at the photodetector. It is noted that the mirror 84 is disposed in the optical path between the facet of the mirror 88 and the collecting lens 96. The area of the mirror 84 is small relative to the cross-sectional area of the reflected light beam and therefore very little signal energy is lost by this obscuration in the beam path. Ambient light rejection is enhanced also by use of the spectral filter. Such filter is effective to transmit the laser light only and to reject ambient light.

The photodetector produces a train of electrical pulses corresponding to the alternation between light bars and dark bars in the code field of the label as the scanning beam sweeps there-across. The electrical pulses from the photodetector, which represent the data encoded on the label are processed by suitable decoding circuitry, not shown.

Figure 12:
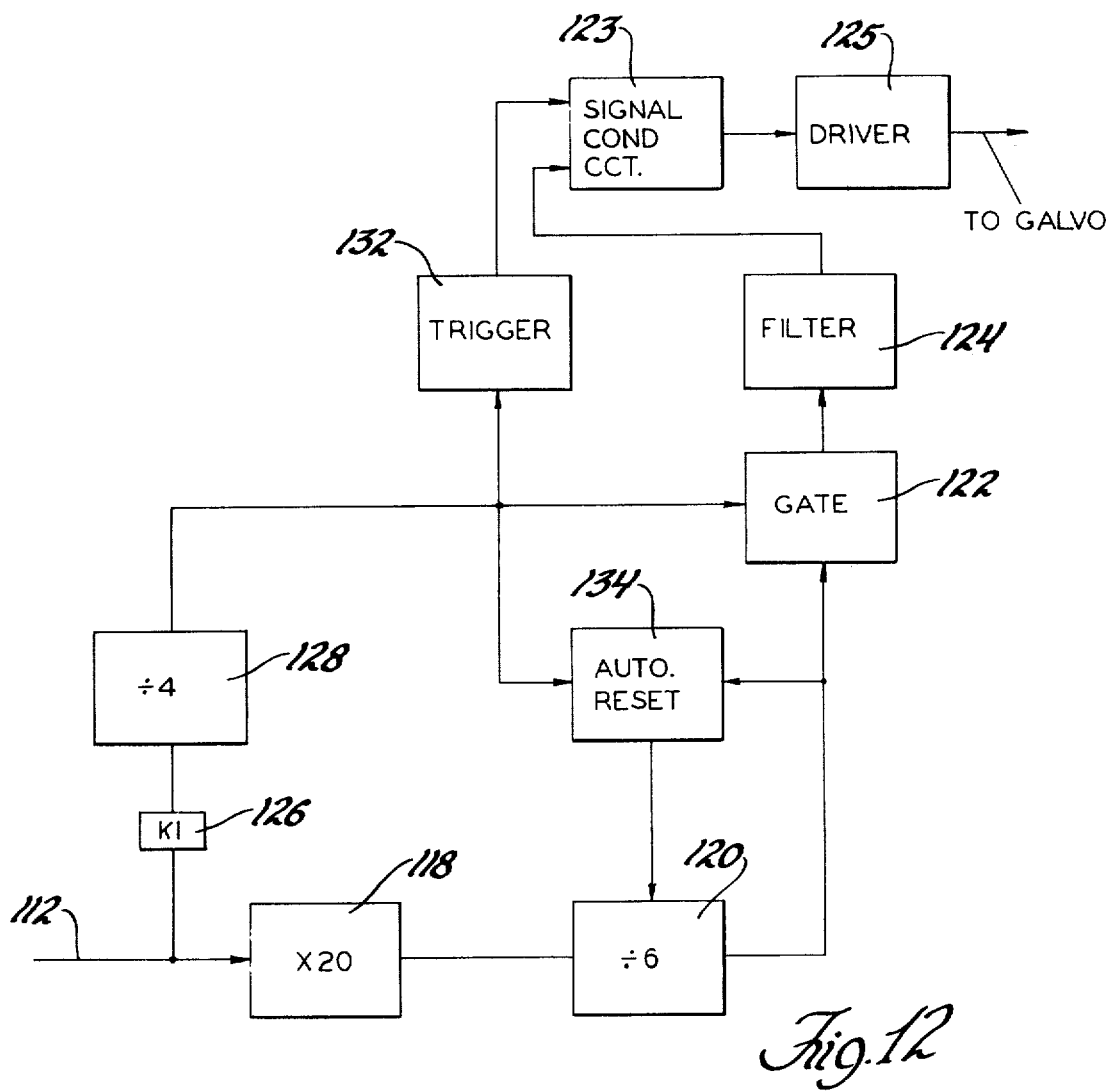
FIG. 12 is a block diagram of a control system for the scanning apparatus of FIG. 10.

In order to synchronize the scanning motion of the galvanometer mirror 84 with the scanning motion of the rotating multifaceted mirror 88, a control circuit is provided as shown in FIG. 12. The input to the control circuit is applied to a conductor 112 and comprises a series of pulses each of which signifies the start of scan by a facet of the rotating mirror 88. The start of scan pulses are produced by an optical pick-off system including an infrared transmitter 114 and a detector 116, as shown in FIG. 10. This arrangement is adapted to produce a pulse which coincides with the transition of the laser beam from one facet to the next. The input pulses, i.e. the start of scan pulses, have a pulse repetition rate determined by the speed of rotation of the mirror 88 and the number of facets thereon. This pulse train is applied to a frequency multiplier 118 and the output thereof is applied to a frequency divider 120. The purpose of the multiplier and divider is to obtain an output pulse frequency equal to that required for energization of the galvanometer 86 for the desired scan frequency ratio. Taking, for example, the scan pattern of FIG. 7 which is a 3-phase with straight line pattern, there are three and one-third cycles of the sinusoidal waveform traces per time frame for each phase. As noted above, the time-axis scan of the optical beam is produced by the successive facets of the rotating mirror 88. The amplitude axis scan of the traces is produced by the galvanometer mirror 84. Accordingly, for the scan pattern of FIG. 7 there are three and one-third cycles of the galvanometer mirror 84 for each facet of the rotating mirror 88, i.e., the ratio of galvanometer cycles to rotating mirror facet cycles is equal to three and one-third. For this example, the multiplier 118 multiplies by 20 and the divider 120 divides by 6 to produce an output pulse train having a frequency equal to three and one-third times the frequency of the start of scan pulses. The pulse train from the divider circuit 120 is applied through a gate 122 and a filter 124 through a signal conditioning circuit 123 to the driver 125 which is connected with the galvanometer 86 and each pulse causes the galvanometer mirror to execute one cycle of sinusoidal oscillation. In the example scan pattern of FIG. 7, it is desired to produce the sinusoidal traces A1, B1 and C1 in time sequence and then produce the straight line trace D1. For this purpose, every fourth pulse produced by the divider 120 must cause the galvanometer deflection to produce the straight line trace D1. To develop a trigger signal for the signal conditioning circuit 123, the start of scan pulses from conductor 112 are applied through a network 126 to a divider circuit 128, which, for the example waveform of FIG. 7, is operative to divide by 4. The output of the divider circuit 128 on conductor 130 provides a pulse upon the occurrence of every fourth pulse of the start of scan pulse train. This output is applied to an inhibit input of the gate 122 which closes the gate and blocks every fourth pulse from the driver stage of the galvanometer. At the same time, the pulse from the divider 128 is applied to the trigger circuit 132 and the output thereof is applied to the signal conditioning circuit 125 which produces the necessary change of energization to cause the galvanometer mirror to hold its position of maximum deflection (rest position) and thus to produce a straight line. Additionally, the output of the divider 128 is applied to a reset circuit 134 which also receives an input from the output of the divider circuit 120 and is effective to reset the divider 120 for a new count of four facet cycles which allows for the straight line scan to begin and end while the galvanometer has its position held. Accordingly, it can be seen that this scanning apparatus causes a phase trace produced in any one time frame, i.e. by one facet, to begin at the same amplitude at which the preceding phase trace ended. Accordingly, the galvanometer 84 is operated in a continuous oscillatory mode at equal amplitude for each of the phase traces A1, B1 and C1, and then a transition is made to the straight line trace D1, by merely holding the galvanometer in its fully deflected position, which is a position of rest, during the straight line trace D1. The galvanometer, is, therefore, in a position to resume the oscillatory mode on ending of the straight line trace. It will be apparent that the trace D1 need not be a straight line, as previously discussed, but may be a low amplitude sinusoidal waveform and the same kind of drive may be used for the galvanometer with modification of the signal conditioning circuit.

SECOND EMBODIMENT OF THE INVENTION

In accordance with the invention, a simplified polyphase scan pattern is provided to achieve omnidirectional reading; this scan pattern is advantageous in respect to the scanner construction and in respect to the data processing equipment.

As discussed above with reference to FIG. 13, the regular UPC code symbol comprises a pair of information code fields each of which has a height H and a width W. Each code field is oversquare and, taken separately, must be read at least by a single-sweep interception. The two code fields may be read by a double-sweep interception assuming, of course, that the data processing equipment has the appropriate capability. Accordingly, the scan pattern must be of such configuration that all of the bar codes in a code field will be intercepted successively by the scanning trace with the code field in any orientation as it is moved through the reading field.

Figure 15:
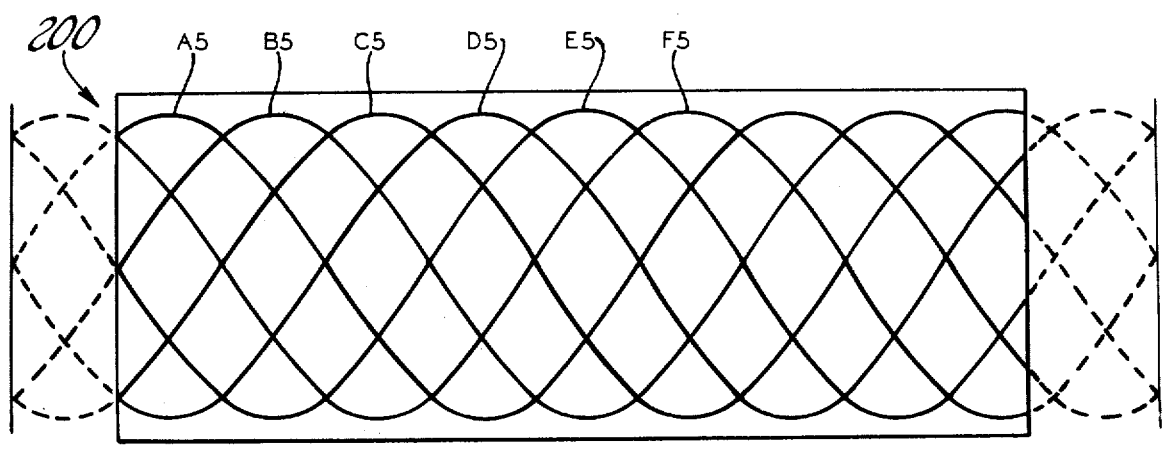
FIG. 15 is a 6-phase scan pattern according to the second embodiment of the invention.

An exemplary polyphase scan pattern for omnidirectional reading, according to a second embodiment of the invention, is shown in FIG. 15. The reading field 26 is laced with a scan pattern 200 which is a six-phase sinusoidal waveform. The scan pattern 200 comprises six successive traces, A5, B5, C5, D5, E5 and F5 in a six-phase relationship. One complete time frame of the scan pattern is illustrated in FIG. 15 and each successive time frame of the pattern is a repetition of that shown. All of the traces are of sinusoidal waveform of the same wavelength and amplitude and are uniformly displaced in phase.

According to the invention, omnidirectional reading is achieved by correlating certain parameters of a polyphase scan pattern with properties of the code field and with certain constraints imposed by the desired system performance. This will be discussed below.

One parameter is the slope angle, $\psi$, of the waveform trace relative to the time axis. For a code field which is square or somewhat oversquare, the maximum angle, $\psi_0$, of the trace is preferably in the range from about 45° to about 60°. These limits will be understood from the considerations which follow. It is known that in the special case of a triangular wave trace, a square code field at standstill can be read omnidirectionally with a trace at a 45° slope; further, with an oversquare code field an omnidirectional reading can be obtained with a trace slope correspondingly greater than 45°, i.e. a slope parallel to the diagonal line through the code field. Accordingly, the lower limit of the slope value for the waveform is determined by the aspect ratio or squareness of the code field and must be no less than 45°. The upper limit is determined by other considerations which will be discussed below.

Figure 17:
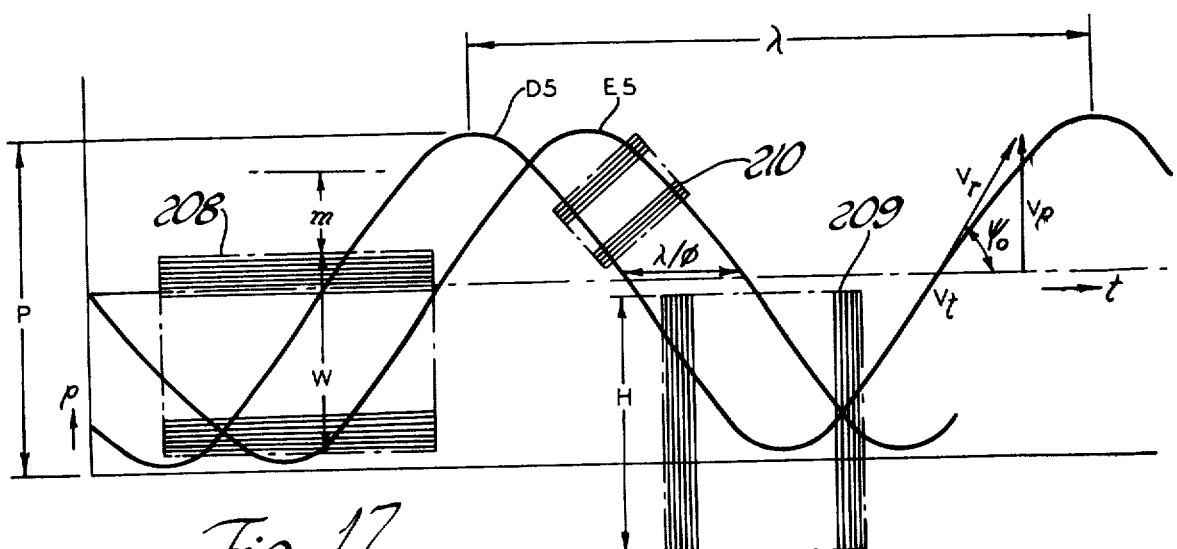
FIG. 17 shows a portion of the scan pattern for explanatory purposes.

Further discussion of the slope of the sinusoidal trace waveform will be aided by reference to FIG. 17. This FIGURE shows a portion of trace waveforms D5 and E5 of the scan pattern of FIG. 15. The sinusoidal waveforms have a slope which vary as a function of displacement along the time axis and the variation ranges from a maximum value of slope $\psi_0$ when the sine wave is at zero amplitude to a value of zero when the sine wave is at its peak or maximum value. In the generation of the sinusoidal waveform the velocity of the light spot along the time axis, $v_t$, is constant and the velocity along the amplitude axis, $v_p$, varies sinusoidally as a function of time. Accordingly, the resultant velocity of the light spot is at its maximum value at the crossing of the time axis, being the vector sum of the time axis velocity and the amplitude axis velocity. The resultant velocity of the light spot is at its minimum value at the peak amplitude of the waveform since the amplitude axis velocity is zero and hence the resultant is equal to the time axis velocity. The variation in the resultant velocity of the light spot is of importance in the processing of the data bits produced by the scanner. In particular, the bit width produced by the scanner varies inversely with spot velocity and hence the time per bit at high velocity is smaller than that at low velocity. In the data processing equipment the bandwidth must be great enough to accommodate the variation in time per bit; a large variation of spot velocity requires excessive bandwidth capabilities in the data processing equipment. Accordingly it is desired to restrict the range of velocity variation so that the time per data bit does not vary by a ratio greater than a certain value. For this purpose, the time per data bit is at its maximum value when the code field is superimposed on the waveform in the region of low light spot velocity and oriented so that the trace crosses the code bars obliquely; the minimum time per bit occurs when the code field is superimposed on that portion of the waveform where the velocity is maximum and the code bars are oriented so that the light spot crosses the code bars perpendicularly.

In order to limit the range of variation of time per data bit so that the ratio of the maximum to minimum values does not exceed a predetermined value, the slope of the trace waveforms must be limited to a certain maximum value. With a predetermined ratio, R, the resultant velocity, $v_r$, must not exceed R times the time axis velocity, $v_t$. This relationship yields a maximum amplitude axis velocity equal to $v_t \sqrt{R^2-1}$. The corresponding slope angle of the trace is the arctangent of $v_p/v_t$ which equals $\sqrt{R^2-1}$. For example, if the range of variation of light spot velocity is to be limited so that the ratio of the maximum to the minimum values does not exceed two, the maximum slope angle $\psi_0$ will be equal to the arctangent of $\sqrt{3}$. This corresponds to a maximum slope angle of 60°. The foregoing discussion is based upon the trace waveforms as they appear on the window; the waveforms are preferably produced by having the plane of the scanning beam tilted away from the normal to the window by an angle of about 35° to permit reading of labels on the side of a package as well as the bottom. It will be understood that tilting a label relative to the window will increase the angle $\psi_0$ unless the tilt is in the direction which makes it nearer to being normal to the beam.

Another parameter of the polyphase waveform is the peak-to-peak amplitude, P, which must be at least equal to the width of the largest code field to be read. If the amplitude is less than this value a reading could not be obtained with the code field oriented with the code bars parallel to the time axis. A large code field 208 is depicted in this orientation in FIG. 17. Considering the fact that the code symbol will be in motion through the reading field, the peak-to-peak amplitude should be somewhat greater than the width of the code field. It is noted, however, that other phase traces will also provide an opportunity to obtain a reading of the large code field. In general, the peak-to-peak amplitude of the waveform should be at least equal to the width, W, of the code field plus a margin, m, equal to the product flow rate multiplied by the time between any pair of traces which will both read the code field. The peak-to-peak amplitude may be greater than this value. However, it is preferred to utilize a peak-to-peak amplitude which affords an ample opportunity to read and yet which represents a reading field depth which is of desired depth for operator efficiency.

Another parameter of the waveform which must be established properly to obtain omnidirectional reading is the wavelength, $\lambda$. In order to obtain a reading with the code field oriented with the code bars perpendicular to the time axis, as illustrated by code field 209 in FIG. 17, one-half wave-length must be equal to or greater than the width, W, of the code field. This requirement must be reconciled with the fact that once the slope angle $\psi_0$ and the peak-to-peak amplitude of the wave trace are established, the wavelength is determined thereby; the wavelength is equal to $\pi$ times P divided by the tangent of $\psi_0$. Accordingly, the wavelength, amplitude and slope angle must be correlated to meet the aforementioned requirements. The system may be designed to allow a certain amount of overscan along the time axis as indicated by the dashed lines in FIG. 15 so that the scanning field is actually wider than the window with the ends of the traces being blocked from the reading field.

Figure 18:
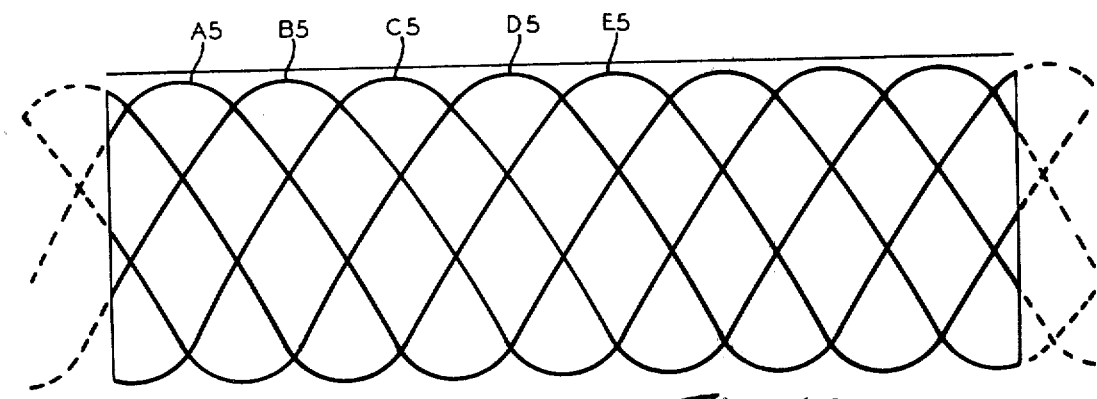
FIG. 18 shows a 5-phase scan pattern.

The number of phases $\phi$ in the scanning pattern establishes the spacing between traces along the time axis and is determined in accordance with the dimensions of the code field. With reference to FIG. 17 it is noted that the space between two adjacent traces, such as traces D5 and E5, is a diagonally extending "corridor" which may, under certain circumstances, allow a small code field to pass without a reading. As depicted in FIG. 18 a small code field 210 moving through the reading field in a direction perpendicular to its code bars and parallel to the waveform traces would not be read unless the time axis spacing of the phase waveforms is less than the height of the code field. The spacing between traces for a polyphase pattern is the wavelength, $\lambda$, divided by the number of phases $\phi$ and, therefore, this value should be equal to or less than the height of the code field.

The polyphase scan pattern of this invention is preferably generated so that one phase trace ends at the same amplitude as the succeeding phase trace commences. The scanning pattern differs in the nature of a Lissajous pattern as produced by a cathode ray oscilloscope by the fact that there is no visible retrace in the scanning pattern and hence it is an interrupted trace. The scan pattern is, however, preferably produced by deflection at one frequency along the amplitude axis and deflection at another frequency along the time axis, the deflection frequencies being related by an exact ratio which is expressed as the quotient of two whole numbers, such as 11/6, 9/5, etc. In general, for a polyphase scan pattern having $\phi$ phases, the number of deflection cycles along the amplitude axis for each deflection cycle along the time axis is given by the expression: $K \pm n/\phi$ where n is any integer less than $\phi$ except those which can be divided evenly into $\phi$ and where K is any integer. In the preferred embodiment of FIG. 15 the number of phases is 6 and the scanning frame which contains all six phase traces has a width equal to 11/6 wavelengths, i.e., 11 cycles of deflection along the amplitude axis for six cycles of deflection along the time axis. This is a preferred scan pattern for the UPC code symbols since it meets all of the above described criteria for omnidirectional reading. Other scan patterns having a different deflection frequency ratio may be employed, depending upon code field dimensions, to meet the above described criteria for omnidirectional reading. Other scan patterns having a different deflection frequency ratio especially adapted for the UPC code symbols will be described subsequently.

Figure 14:
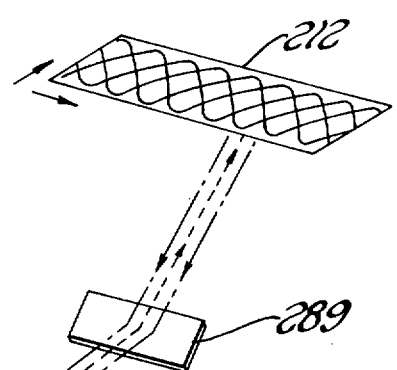
FIG. 14 is a diagram of the scanner according to the second embodiment of the invention.
Figure 14:
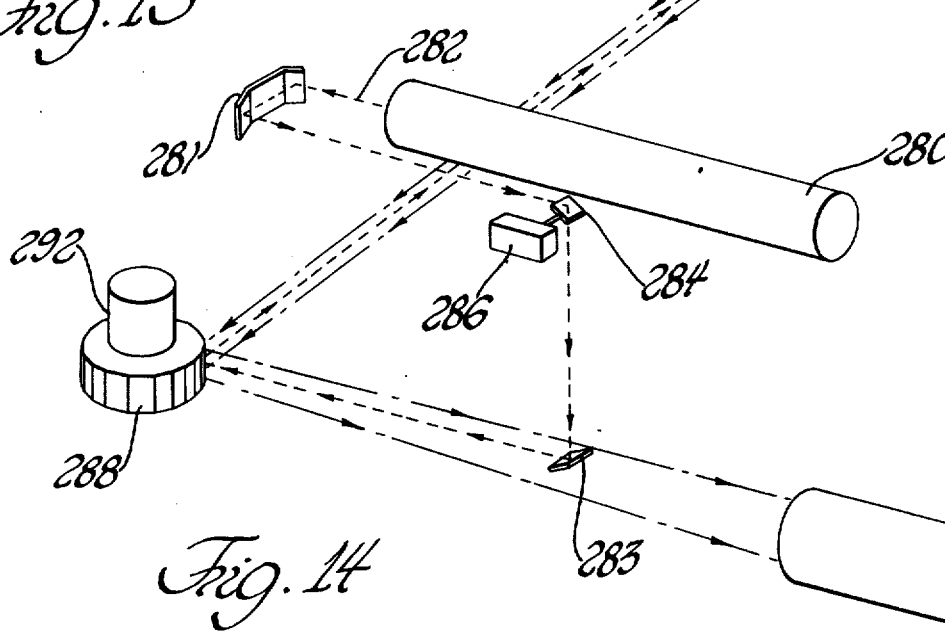
Figure 16:
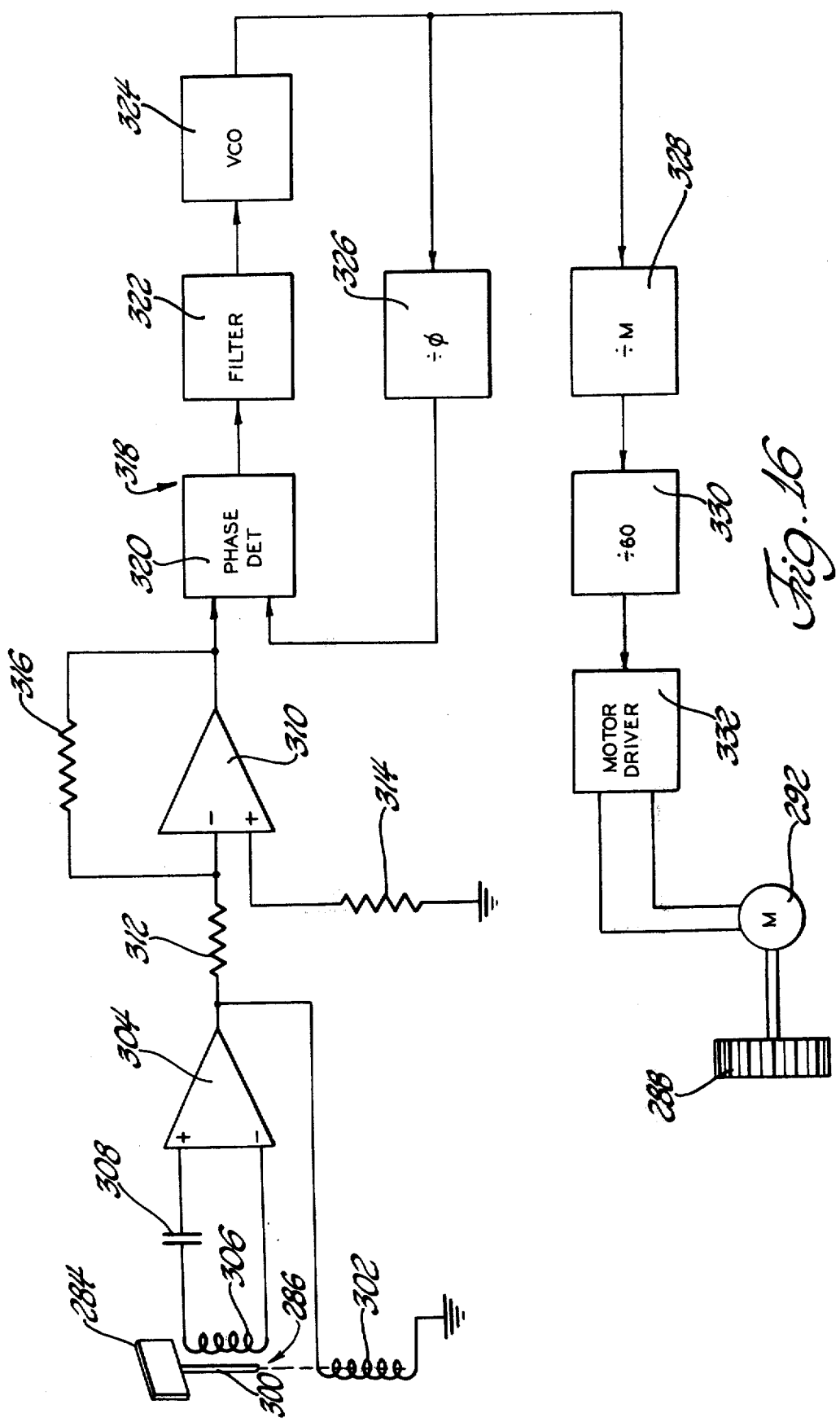
FIG. 16 is a diagram of the control circuit for the scanner according to the second embodiment of the invention.

Referring now to FIGS. 14 and 16, the apparatus of the second embodiment of the invention is illustrated. FIG. 14 shows the general arrangement of the scanning apparatus which is suitably disposed beneath the counter top 10 of the checkstand which was described with reference to FIG. 1. The scanning apparatus is, in general, similar to that described with reference to FIGS. 10 and 11 except that the optical paths are folded somewhat differently and an electromechanical resonator, instead of a galvanometer, is used for driving the oscillatory mirror for generating the scan motion in the direction transversely of the time axis.

In this embodiment, the scanning apparatus comprises coacting scan motion producing components, namely, a rotatable multifaceted mirror 288, driven at constant speed by a rotary motor 292 to produce a time axis scan, and an electromechanical resonator 286 which has a mirror 284 mounted thereon to produce oscillatory scan motion of the beam in a direction transversely of the time axis. A laser 280 produces a light beam 282 which impinges upon a corner reflector 281 and is reversed in a direction thereby. The light beam is reflected by the reflector 281 onto the oscillatory mirror 284 and is directed thereby onto a fixed post mirror 283. The light beam is reflected from the mirror 283 onto one of the facets 295 of the rotatable multifaceted mirror 288 and thence to a fixed mirror 289 which reflects the beam onto the window 212.

The electromechanical resonator 286 is of the type which includes an angularly oscillatable shaft adapted for harmonic motion in the manner of a torsional pendulum. The resonator is driven by an alternating voltage which has the same frequency as the natural resonant frequency of the device. Accordingly, the mirror 284 is driven in oscillatory angular motion as a sinusoidal function of time at constant frequency. The light beam is reflected from the mirror 284 in a linear scan motion onto the post mirror 283 and thence onto the multifaceted mirror 288, the linear scan motion of the beam as it reaches the mirror 288 being parallel to the rotation axis of the mirror 288. As a result of the linear scan motion produced by the oscillatory mirror 284 the light beam sweeps across the particular facet 295 on which it impinges. The mirror 288 has an axial dimension sufficient to accommodate the full extent of the angular sweep of the light beam. The facets of the rotating mirror intercept the beam successively as the mirror rotates and each facet causes the beam to sweep across the scanning field along the time axis. The scanning motion along the time axis commences upon the initial interception of the beam by a given facet and the sweep of the light spot along the time axis is at a nearly constant speed because the angle of deflection is small. During the sweep of the light spot along the time axis the oscillatory mirror 284 causes displacement of the light spot from the time axis which varies as a sinusoidal function of time. Accordingly, the light spot describes a sinusoidal trace across the scanning field, each trace beginning with the initial interception of the beam by a given facet of mirror 288 and ending when the given facet no longer intercepts the beam. Since the facets are contiguous, the sweep is repeated by the succeeding facet. The scanning motion is unidirectional along the time axis and the rapid retrace is not visible on the window.

The optical signal detection arrangement of the embodiment of FIG. 14 is generally similar to that described with reference to FIGS. 10 and 11. This detection system includes a photodetector 294 which receives a portion of the scattered light which results from the code field being scanned by the laser spot. The portion of the light scattered from the code field impinges upon the fixed reflector 289 and is reflected thereby onto the rotating mirror 288 and thence through suitable optical elements (not shown) to the photodetector 294. The photodetector produces a train of electrical pulses corresponding to the alternation between light bars and dark bars in the code field being scanned. The pulses from the photodetector, which represent the data encoded on the code symbol are processed by suitable decoding circuitry, not shown.

As mentioned above, the six-phase pattern of FIG. 15 is produced on the scanning field by providing 11 cycles of oscillation along the amplitude axis for six cycles along the time axis. This is accomplished by a control means which will be described below with reference to FIG. 16.

The control circuit for synchronizing the rotational motion of the multifaceted mirror 288 with the oscillatory motion of the resonator mirror 284 will now be described with reference to FIG. 16. The resonator 286, as previously described, is an electromechanically energized torsional pendulum having a selected resonant frequency at which the mirror 284 supported thereby is to oscillate. The resonator includes a torsionally resonant rod 300 which supports the mirror 284 and which is energized at its resonant frequency by a coil 302. The coil 302 is electrically energized by an amplifier 304 which has a pickup or feedback coil 306 connected across the amplifier input through a differentiating capacitor 308. The motion of the rod 300 produces a voltage in the feedback coil 306 which, along with the capacitor 308 develops a feedback signal in proper phase relationship with the output of amplifier 304 to sustain the oscillations of the resonator at its resonant frequency.

The output of the amplifier 304 is applied to one input of an amplifier 310. The other input of the amplifier 310 is connected to ground through a resistor 314. The output of the amplifier 310 is fedback through a resistor 316 to the first input. This amplifier 310 develops an output voltage having a frequency equal to the resonant frequency of the resonator 286 and this output signal is applied to the input of a phase lock loop 318. The phase lock loop comprises a phase detector 320 having one input connected to the output of amplifier 310. The output of the phase detector is applied through a filter 322 to the input of a voltage controlled oscillator 324. The output of the voltage controlled oscillator is applied to the input of a frequency divider 326 having its output connected to the other input of the phase detector 320. The phase lock loop operates in a conventional manner to produce an output signal from the voltage controlled oscillator with a frequency equal to a predetermined multiple of the frequency of the input signal; in particular, the predetermined multiple is a divisor, $\phi$, of the frequency divider 326. The output of the voltage controlled oscillator 324 is applied to the input of a frequency divider 328 having a divisor M which produces an output having a frequency equal to $\phi/M$ times the resonator frequency. The output of the frequency divider 328 is applied to the input of a frequency divider 330. The output of the divider 330 is applied to the input of the motor driver 332 which energizes the motor 292. The motor 292 is a synchronous motor and is held in exact synchronism with the oscillations of the resonator by the control circuit just described. The frequency divider 330, in the illustrative embodiment, has a divisor of 60, which taken in conjunction with the frequency dividers 326 and 328 produces the desired ratio of the resonator frequency to the facet frequency produced by the rotating mirror 288. The divisor, $\phi$, of the frequency divider 326 and the divisor, M, of the frequency divider 328 are selected in accordance with the desired deflection frequency ratio of the scan pattern. On the other hand, the divisor 60 of the frequency divider 330 is selected in relation to the number of facets on the mirror 288 and the number of poles of the motor 292 so that the facet frequency will be the same as the input frequency to the divider 330.

In operation, the control circuit maintains synchronism between the rotatable mirror 288 and the oscillatory mirror 284 so that the deflection frequency along the amplitude axis is a predetermined ratio of the deflection frequency along the time axis. This synchronous operation of the deflection mirrors provides each phase trace with a predetermined fractional number of wavelengths and a wave pattern of a predetermined number of phases. In the six-phase scan pattern of FIG. 15, the predetermined ratio is 11/6, i.e. the deflection frequency ratio. This is achieved with the control circuit of FIG. 16 by using a divider 326 with $\phi$ equal to 6 and a divider 328 with M equal to 11.

A polyphase scan pattern for a given set of bar code symbols, such as the UPC standard symbol (Version A), may be selected by applying the foregoing criteria in the following manner. The selection process involves making an initial assumption of the number of phases in the scan pattern for the given constraints of the system and applying the criteria to determine the other parameters of the scan pattern. The process is iterative in that if the criteria cannot be met with the assumed number of phases then another number of phases must be assumed and the criteria applied again.

An example polyphase scan pattern is given in FIG. 15 which was discussed above. This scan pattern is selected for omnidirectional reading of the standard UPC code symbol (Version A). The given constraints are a product flow rate of 100 inches per second and a time axis scan rate of 1000 per second. With a six-phase pattern this yields a frame rate of 166 per second and sequential scan pairs may occur at a rate of 333 per second. Further, the bandwidth is to be limited by limiting the spot scan speed to a range of variation in which the ratio of maximum to minimum speed does not exceed two to one. From the criteria discussed above regarding the trace waveform slope angle, it is known that a maximum slope angle, $\psi_0$ must be greater than 45° and, for the bandwidth limitation given, it must be less than 60°. The value of the maximum slope angle is determined more particularly within this range in accordance with the given constraints and considering the smallest UPC label which has a width of 0.54 in. and a height of 0.72 in. for each field. To give 100% probability of reading, the maximum slope angle, $\psi_0$, has to be large enough so that at least one trace will intersect all of the code bars with the label moving at the maximum flow rate with the code bars parallel to the time axis. This requires a slope angle given by the following:

$$\psi_0 \geq \arctan \frac{d+W}{H}$$

where $d$ = distance travelled in time between occurrence of sequential scan pairs (100 in/sec $\times$ 0.003 sec.)
$W$ = width of code field (0.54 in.)
$H$ + height of code field (0.72 in.)
This expression yields a value for $\psi_0$ of about 50°; it is noted that this sets the lower limit for the slope angle, $\psi_0$, of the trace waveform. Therefore the permissible range of $\psi_0$ is greater than 50° and less than 60°. According to the criteria discussed above regarding the peak-to-peak amplitude, P, the value of P must be equal to or greater than the width of the largest code field. This value is 1.3 inches. According to the criteria for wavelength, $\lambda$, as discussed above, this value should be equal to or greater than twice the width of the largest code field. Accordingly, $\lambda$ must be equal to or greater than 2.6 in. In order to balance the probabilities of reading with the code field bars perpendicular to the time axis against the probabilities of reading with the code bars parallel to the time axis, the maximum slope angle, $\psi_0$, should be adjusted in value according to the ratio P/$\lambda$ of the limiting values for these parameters specified above. This ratio, P/$\lambda$, is 0.5 and, since $\psi_0$ equals the arctangent of $\pi P/\lambda$, the median value of $\psi_0$ is 57.5°. In order to increase the number of scan interceptions, the peak-to-peak amplitude of the waveform may be increased from a lower limiting value of 1.3 inches up to 2.0 inches which is the largest desirable depth of the reading field. With P equal to 2 inches, and keeping the ratio P/$\lambda$ constant at 0.5, the wavelength is established at 4 inches. The number of phases required may now be examined according to the criteria discussed above. For 100% probability of scan interception for the small label, the wavelength divided by the number of phases must be equal to or less than the height of the small code field. Dividing the wavelength of 4 inches by the height of 0.72 inches gives a quotient of 5.5; the nearest larger integer value, namely, 6, is the number of phases required. This verifies the initial assumption of six phases for the selected pattern. The exemplary scan pattern of FIG. 15 is a six-phase pattern with a deflection frequency ratio of 11/6. In this scan pattern the maximum slope of the traces is 56.3° and the spacing between phase traces is 0.7 inches.

Other polyphase scan patterns are also suitable for use with the UPC code symbols. One such scan pattern is shown in FIG. 18 and comprises a five-phase pattern with phase traces A6 through E6 and a deflection frequency ratio of 9/5. In this scan pattern the maximum slope of the traces is 55.7°, the spacing between phase traces is 0.85 inches and the frame rate is 200 frames per second. Although the spacing between phases is greater than 0.72 inches, it is a useful pattern when considering product flow movements which are constrained to motions essentially perpendicular to the scan direction. This scan pattern can be generated with the scanner of FIGS. 14 and 16 wherein the divider 328 has a divisor M equal to 9 and the divider 326 has a divisor $\phi$ equal to 5.

Figure 19:
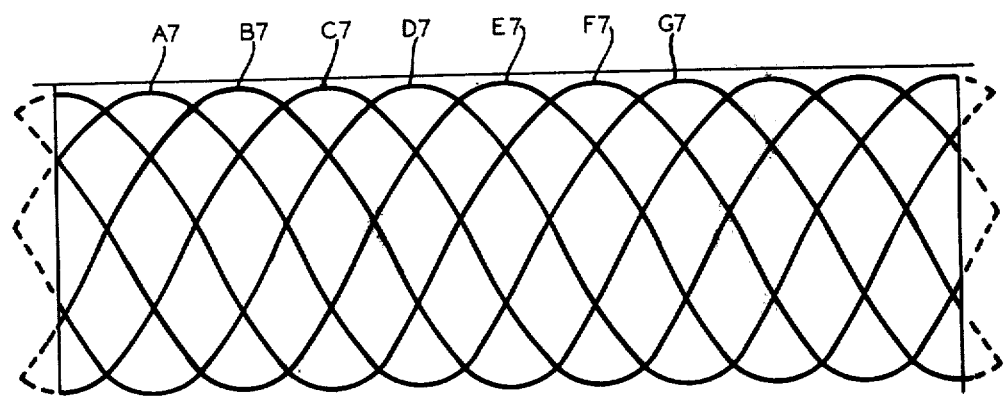
FIG. 19 shows a 7-phase scan pattern.

Another polyphase scan pattern suitable for the UPC code symbol is shown in FIG. 19. This scan pattern is a seven-phase arrangement and comprises, in each frame, seven phase traces A7 through G7. The maximum slope of the phase traces in this pattern is 55.8° and the spacing between phase traces is 0.59 inches with a frame rate of 145 frames per second. This scan pattern can be generated with the scanner of FIGS. 14 and 16 wherein the divider 328 has a divisor M equal to 13 and the divider 326 has a divisor $\phi$ equal to 7.

Although the description of this invention has been given with reference to a particular embodiment it is not to be construed in a limiting sense. Many variations and modifications will now occur to those skilled in the art. For a definition of the invention, reference is made to the appended claims.

The embodiments of the present invention in which an exclusive property or privilege is claimed are defined as follows:

1. In a code reader for encoded packages bearing bar code symbols and passing across a scanning window, the code symbols having a rectangular code field, a scanner adapted to scan a reading field adjacent the window and having a transverse axis across which the code symbols are moved and having a longitudinal axis perpendicular to the transverse axis, said scanner comprising means for producing a light beam, deflection means, including optical means in the path of the light beam, first drive means operatively coupled with the optical means for cyclically deflecting the beam in the direction of the transverse axis as a linear function of time, and second drive means operatively coupled with the optical means for simultaneously cyclically deflecting the beam in the direction of the longitudinal axis as a sinusoidal function of time to produce a trace segment having a substantially sinusoidal waveform of uniform wavelength in the reading field for a cycle of deflection in the direction of the transverse axis, said deflection means including phase displacing means for displacing successive trace segments in the direction of the transverse axis by a controlled amount, whereby the trace segments produce a polyphase scan pattern on said window.

2. The invention as defined in claim 1 wherein said optical means includes first and second mirror means in the path of the light beam, said first and second drive means being connected respectively with the first and second mirror means, the first mirror means producing a deflection of the light beam in the direction of the transverse axis, said second mirror means producing deflection of the light beam in the direction of the longitudinal axis.

3. The invention as defined in claim 2 wherein the cyclical frequency of the first mirror means is related to the cyclical frequency of the second mirror means so that the second mirror means executes at least one cycle during each cycle of the first mirror means whereby each trace segment comprises at least one full wavelength.

4. The invention as defined in claim 1 including control means connected with the second drive means for producing a waveform having a peak-to-peak amplitude greater than the width of the largest code field.

5. The invention as defined in claim 1 wherein said deflection means includes control means for producing a waveform having a wavelength greater than twice the width of the largest code field.

6. The invention as defined in claim 1 wherein said deflection means includes control means for providing a scan pattern which includes a waveform having a peak-to-peak amplitude greater than the width of the largest code field and a waveform having a wavelength greater than twice the width of the largest code field.

7. The invention as defined in claim 1 wherein said phase displacing means displaces each successive trace segment an amount substantially equal to the height of the code field.

8. The invention as defined in claim 7 wherein said phase displacing means comprises synchronizing means connected with the drive means of the deflection means.

9. The invention as defined in claim 8 wherein said synchronizing means is operative to maintain the frequency of the first and second mirror means in a ratio equal to a number including a fraction whereby the trace segments are in the pattern of a polyphase waveform with the number of phases equal to the denominator of said fraction.

10. The invention as defined in claim 9 wherein said ratio is equal to an integer plus a fraction which cannot be reduced to yield a denominator less than the number of phases.

11. The invention as defined in claim 2 wherein said second drive means comprises an oscillatory motor having an oscillatable shaft, the second mirror means being mounted on said shaft.

12. The invention as defined in claim 11 wherein said first drive means is a rotary motor having a rotatable shaft and the first mirror means is a rotatable multifaceted mirror on said rotatable shaft.

13. The invention as defined in claim 6 wherein said waveform has a mininum slope dependent upon the aspect ratio of the code field and a maximum slope dependent upon the desired range of speed of the light spot.

14. The invention as defined in claim 13 wherein said reading field has a width greater than one wavelength and less than two wavelengths.

15. The invention as defined in claim 13 wherein the largest acute angle between the trace segment and the transverse axis is in the range of about 45° to about 60°.

16. The invention as defined in claim 10 wherein said ratio is eleven-sixths.

17. The invention as defined in claim 10 wherein said ratio is nine-fifths.

18. The invention as defined in claim 11 wherein said oscillatory motor is an electromechanical resonator.

19. The invention as defined in claim 18 including synchronizing means connected between the rotatable motor and the resonator.

20. The invention as defined in claim 19 wherein said synchronizing means comprises an electrical oscillator which includes said resonator, an energizing circuit for the motor, and frequency changing means connected between said oscillator and the energizing circuit.

21. The invention as defined in claim 20 wherein said frequency changing means comprises frequency multiplying means and frequency dividing means.

22. The method of scanning a reading field to intercept the code elements of bar code symbols moving through the reading field in a randon orientation, the method comprising the steps of: repeatedly scanning the reading field from one side to the other with a light spot travelling in a sinusoidal path of uniform wavelength to produce a trace waveform having a peak-to-peak amplitude greater than the width of the largest code field, and shifting each successive trace waveform relative to said reading field in one direction along the axis of the waveform, the amount of said shifting being a fraction of a wavelength to produce a polyphase pattern.

23. The invention as defined in claim 22 wherein the amount of said shifting is substantially equal to the height of the smallest code field.

24. The invention as defined in claim 23 wherein the amplitude of the waveform is such that the largest angle between the trace segment and the waveform axis is in the range of about 45° to about 60°.

25. The invention as defined in claim 23 wherein said reading field has a width greater than one wavelength and less than two wavelengths.

26. The invention as defined in claim 22 wherein the greatest angle between the trace segment and the waveform axis has a value of about 56°.

27. The invention as defined in claim 22 wherein the amount of said shifting is one-sixth of a wavelength.

28. The invention as defined in claim 22 wherein the amount of said shifting is one-fifth of a wavelength.

29. The invention as defined in claim 22 including the additional step of periodically modifying said scanning to cause the light spot to travel in a path to produce a recurrent waveform having a wavelength greater than twice the width of the largest code field.

30. The invention as defined in claim 22 including the addition step of periodically modifying said scanning to cause the light spot to travel in an undulatory path in which the maximum slope angle is substantially less than 45°.

31. The invention as defined in claim 29 wherein said recurrent waveform is a substantially straight line.

32. The invention as defined in claim 30 wherein the amount of said shifting is less than the height of the smallest code field.

33. The invention as defined in claim 32 wherein the amplitude of the sinusoidal waveform is such that the largest angle between the trace segment and the transverse axis is in the range of about 45° to about 60°.

34. The invention as defined in claim 33 wherein the amount of shifting is one-third of a wavelength.

* * * * *